(12) United States Patent
Kuwaba

(10) Patent No.: US 6,632,409 B1
(45) Date of Patent: Oct. 14, 2003

(54) REFORMER FOR FUEL CELL SYSTEM

(75) Inventor: Koichi Kuwaba, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/468,782

(22) Filed: Dec. 21, 1999

(30) Foreign Application Priority Data

Dec. 21, 1998 (JP) ............................................. 10-363252

(51) Int. Cl.[7] ................................ B01J 8/02; F28D 7/00
(52) U.S. Cl. ...................... 422/198; 422/189; 422/190; 422/200; 422/211; 422/234; 422/235; 429/17; 429/19; 48/127.9
(58) Field of Search ................................ 422/189, 190, 422/198, 200, 211, 234, 235; 429/17, 19; 48/127.9, 197 R, 203, 197 FM

(56) References Cited

U.S. PATENT DOCUMENTS

| | | | |
|---|---|---|---|
| 3,973,993 A | * | 8/1976 | Bloomfield et al. .......... 429/17 |
| 3,982,962 A | * | 9/1976 | Bloomfield .................. 429/19 |
| 4,004,947 A | * | 1/1977 | Bloomfield .................. 429/17 |
| 4,464,444 A | * | 8/1984 | Mikawa ........................ 429/13 |
| 4,650,727 A | * | 3/1987 | Vanderborgh et al. ...... 422/193 |
| 4,670,359 A | * | 6/1987 | Beshty et al. ................. 429/17 |
| 5,360,679 A | * | 11/1994 | Buswell et al. ............... 429/19 |
| 6,284,398 B1 | | 9/2001 | Kiryu |

FOREIGN PATENT DOCUMENTS

| | | |
|---|---|---|
| DE | 44 38 555 | 3/1996 |
| DE | 195 39 648 | 5/1997 |
| GB | 2 294 577 | 5/1996 |
| JP | 4-325401 | 11/1992 |
| JP | 8-100184 | 4/1996 |

* cited by examiner

Primary Examiner—Jerry D. Johnson
Assistant Examiner—Basia Ridley
(74) Attorney, Agent, or Firm—Oblon, Spivak, McClelland, Maier & Neustadt, P.C.

(57) ABSTRACT

A reformer includes an evaporation portion for evaporating a raw material, a reforming portion for producing a reformed gas whose principal element is hydrogen from the raw materials, a CO reduction portion for reducing CO involved in the reformed gas, a circulating conduit portion having a storage tank for storing the raw material, a feeding device for feeding the raw material under pressure, a cooling device for cooling the CO reduction portion and a supply device for supplying the raw material to the evaporation portion. The supply device includes a conduit branched from the circulating conduit portion connected to the evaporation portion and a flow control device provided in the conduit.

4 Claims, 4 Drawing Sheets

REFORMER FOR FUEL CELL SYSTEM

BACKGROUND OF THE INVENTION

1. Field of the Invention

The present invention is directed to a reformer which is associated with a fuel cell system.

2. Description of the Related Art

Generally speaking, in fuel cell systems, electric power is generated in a fuel cell stack by using a fuel gas and an oxidizing agent gas. The fuel gas is supplied from a reformer in which a fuel of the hydrocarbon family is reformed into a fuel gas whose principal component is hydrogen. Due to the fact that such a fuel gas involves 0.3–2% CO, it can cause poisoning of the electrode catalyst, thereby considerably lowering the performance of the fuel cell system.

To prevent such a drawback, Japanese Laid-open Patent No. Hei.8-100184, published in 1996 without examination, discloses a carbon monoxide removing system in which a raw material to be reformed is first used for cooling the carbon monoxide removing system and thereafter is reformed so as to reduce the CO concentration in a hydrogen-rich fuel gas below 100 ppm.

However, if a load of the fuel call system increases, the flow mass of the raw material also increases, which causes an abrupt cooling of the carbon monoxide removing system, thereby unbalancing the same in temperature. Due to the fact that the operation of a reformer is based on the temperature of the carbon monoxide removing system, such an imbalanced condition may cause an unexpected operation of the reformer.

SUMMARY OF THE INVENTION

It is therefore a principal object of the present invention to provide a reformer which is free from the foregoing drawback.

In order to attain the above and other objects, the present invention provides a reformer, especially for fuel cell systems, which comprises an evaporation portion for evaporating a hydrocarbon family fuel and a water as raw materials; a reforming portion for producing a reformed gas whose principal element is hydrogen from the raw materials; a CO-reduction portion for reducing CO involved in the reformed gas; a circulating conduit portion including storage means for storing one of the hydrocarbon family fuel, the water, and a mixture of the hydrocarbon family fuel and the water, a feeding means for feeding one of the raw materials under pressure, and cooling means for cooling the CO reduction portion; and supply means for supplying the raw materials to the evaporation portion, the supply means including a conduit branched from the circulating conduit portion connected to the evaporation portion, and a flow control means provided in the conduit.

BRIEF DESCRIPTION OF THE DRAWINGS

These and other features and advantages of the present invention will be more readily apprehended from the following detailed description when read in connection with the appended drawing, which forms a part of this original disclosure, and wherein.

DETAILED DESCRIPTION OF THE PREFERRED EMBODIMENTS

First Embodiment

Figure 1:
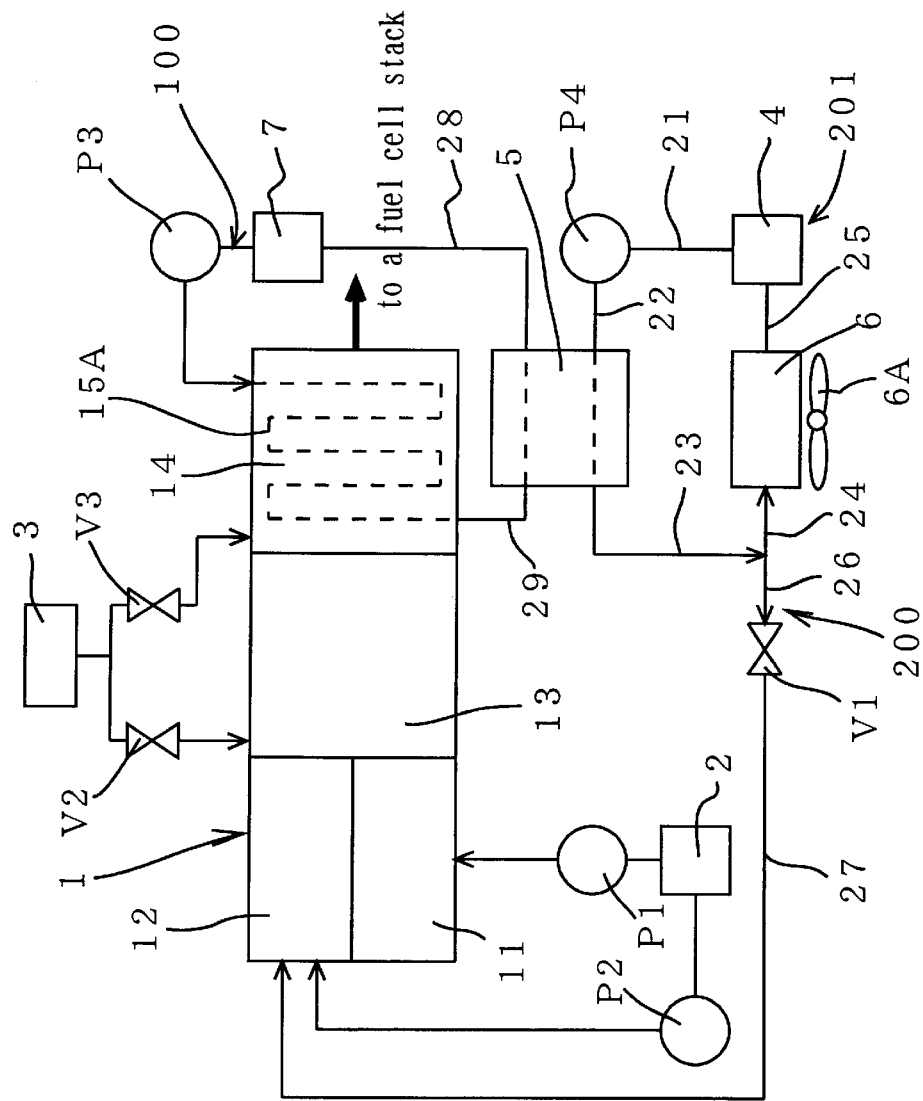
FIG. 1 is a schematic diagram of a reforming system including a reformer in accordance with a first embodiment of the present Invention

With reference to FIG. 1, there is illustrated a schematic diagram of a reforming system including a reformer 1 in accordance with a first embodiment of the present invention. The reforming system includes, in addition to the reformer 1, a methanol tank 2, an air compressor 3, a coolant circulating conduit portion 100 and a water supply portion 200. The reformer 1 is made up of a combustion portion 11, an evaporation portion 12, a reforming portion 13, and CO reduction portion 14.

The methanol tank 2 is a means for storing therein an amount of methanol which is one of the raw materials of a fuel gas. The methanol tank 2 is connected to the combustion portion 11 and the evaporation portion 12 of the reformer 1 by way of pumps P1 and P2, respectively. The air compressor 3 is connected to the reforming portion 13 and the CO reduction portion 14 of the reformer 1 by way of flow-control valves V2 and V3, respectively.

The CO reduction portion 14 of the reformer 1 is designed to reduce CO involved in a reformed gas produced in the reforming portion 13 by using a catalyst (not shown), and has a built-in coolant conduit 15A for controlling the temperature of the catalyst. The CO reduction portion 14 of the reformer 1 is connected to a fuel cell stack (not shown) which converts chemical energy to electric energy by an electrochemical reaction between hydrogen in the reformed gas and oxygen in an oxidizing agent gas.

The coolant circulating conduit portion 100 is provided for cooling the CO reduction portion 14 by circulating an oil therethrough as a coolant. The coolant circulating conduit portion 100 includes a reservoir tank 7, a pump P3, and a heat exchanger 5. The reservoir tank 7, which stores therein an amount of oil as the coolant, is connected to the coolant conduit 15A of the CO reduction portion 14 by way of the pump P3.

The coolant conduit 15A of the CO reduction portion 14 is connected to the heat exchanger 5 by way of a coolant conduit 29. The heat exchanger 5 is also connected to the reservoir tank 7 by way of a coolant conduit 28. It is to be noted that instead of oil, other fluids which have the same function or effect as oil can be used as the coolant.

The water supply portion 200 which supplies water as one of the raw materials of the fuel gas to the evaporation portion 12 is made up of a water tank 4, a water pump P4, the heat exchanger 5, a radiator 6 having a fan 6A, and a flow control valve V1.

The water tank 4 is connected to the pump P4 and the radiator 6 by way of a conduit 21 and a conduit 25, respectively. The pump P4 is connected to the heat exchanger 5 by way of a conduit 22. The heat exchanger 5 is connected to the radiator 6 by way of conduits 23 and 24. The water tank 4, the pump P4, the radiator 6, and the conduits 21 to 25 inclusive constitute a water circulating conduit portion 201.

The heat exchanger 5 is interposed between the coolant circulating conduit portion 100 and the water circulating conduit portion 201 for cooling the coolant which passes through the water circulating conduit portion 201.

The heat exchanger 5 is also connected to the flow control valve V1 as a flow rate control means by way of the conduits 23 and 26. That is to say, the water from the conduit 23 is bifurcated into the conduit 24 and a conduit 26. The flow control valve V1 is connected to the evaporation portion 12 by way of a conduit 27.

Upon start up of the reforming system, the pump P1 is turned on, which causes methanol to be supplied from the methanol tank 2 to the combustion portion 11, thereby burning the supplied methanol. Simultaneously, the pump P2 supplies the methanol from the methanol tank 2 to the evaporation portion 12, and the pump P4 supplies water from the water tank 4 to the evaporation portion 12 by way of the heat exchanger 5 and the flow control valve V1.

The water and the methanol supplied to the evaporation portion 12 are evaporated by the heat which is generated at the combustion portion 11 and are fed to the reform portion 13. The resultant water and methanol are mixed with the air supplied from the air compressor 3 by way of the flow control valve V2 and the resultant mixture is reformed by the catalyst to a hydrogen based reformed gas which involves 0.3–2% CO. In order to reduce the CO to be as small as possible, the reformed gas is fed to the CO reduction portion 14 to which air is supplied from the air compressor 3 by way of the flow control valve V3 so as to be mixed with the reformed air. The CO is there reduced by using a CO reduction catalyst which oxidizes the CO in a selective fashion. To establish effective oxidation it is important to keep the CO reduction catalyst at a temperature of 110–200° C.

The temperature of the CO-reduction catalyst is equal to substantially the ambient temperature so long as the reforming system remains inoperative but increases when the reformed gas is supplied, due to the fact that the CO-reduction reaction generates heat. A quick temperature rise of the CO reduction catalyst to an optimal value can be made by reducing the amount of oil passing through the coolant circulating conduit portion 100.

The CO reduction catalyst is cooled when the coolant conduit 15A of the CO reduction portion 14 is supplied with the oil from the reservoir tank 7 by the pump P3. The oil exhausted from the coolant conduit 15A is returned to the reservoir tank 7 by way of the conduit 29, the heat exchanger 5 and the conduit 28.

The oil, while passing through the heat exchanger 5, is cooled by the water supplied from the water tank 4 to the evaporation portion 12. The water is thus pre-heated before being supplied to the evaporation portion 12. Thus, less energy is required to evaporate the water, and the methanol in the evaporation portion 12. In other words, the temperature of the combustion portion 11 can be made to lower, which permits the amount of methanol to be supplied to the combustion portion 11 to be reduced.

The pump P4 supplies a larger amount of water to the heat exchanger 5 than the amount of water to be supplied to the evaporation portion 12. The excess water is returned to the water tank 4 by way of the conduits 23 and 24, the radiator 6, and the conduit 25. If the temperature of this water becomes in much excess of a set value, the fan 6A of the radiator is turned on, which causes forced cooling of the water.

The pump P3 pumps oil at a fixed rate of 10 liters/min, while the pump P4 pumps water at a fixed rate of 5 liters/min. The fan 6A is designed to turn on and turn off immediately when the temperature of the water in the water tank 4 becomes not less than 56° C. and not greater than 54° C., respectively.

Such an operation mode causes the temperature of the oil stored in the reservoir tank 7 to be kept within a range from 90 to 100° C. Of the pumped water amount of 5 liters/min, only the required amount for the reforming is supplied to the evaporation portion 12 by the control of the flow control valve V1. Due to the fact that the water is preheated in the heat exchanger 5, the amount of the methanol to be burned in the combustion portion 11 can be reduced. This preheating is done by Using the heat generated at the CO reduction portion 14, which increases the heat efficiency.

In the foregoing operation mode, since the fixed flow of oil at a stable temperature cools the CO reduction portion 14 both when the load varies and when the load is steady, the temperature of the catalyst in the CO reduction portion 14 can be kept within a range from 110 to 190° C. independent of the operation condition, thereby reducing the CO in the reformed gas to be not greater than 10 PPM in stable fashion. The resultant reformed gas is fed to the fuel cell stack in a stable fashion independent of load variation.

Instead of water as the raw material of the reformed gas, hydrocarbon family fuel or a mixture thereof with water can be used.

Second Embodiment

Figure 2:
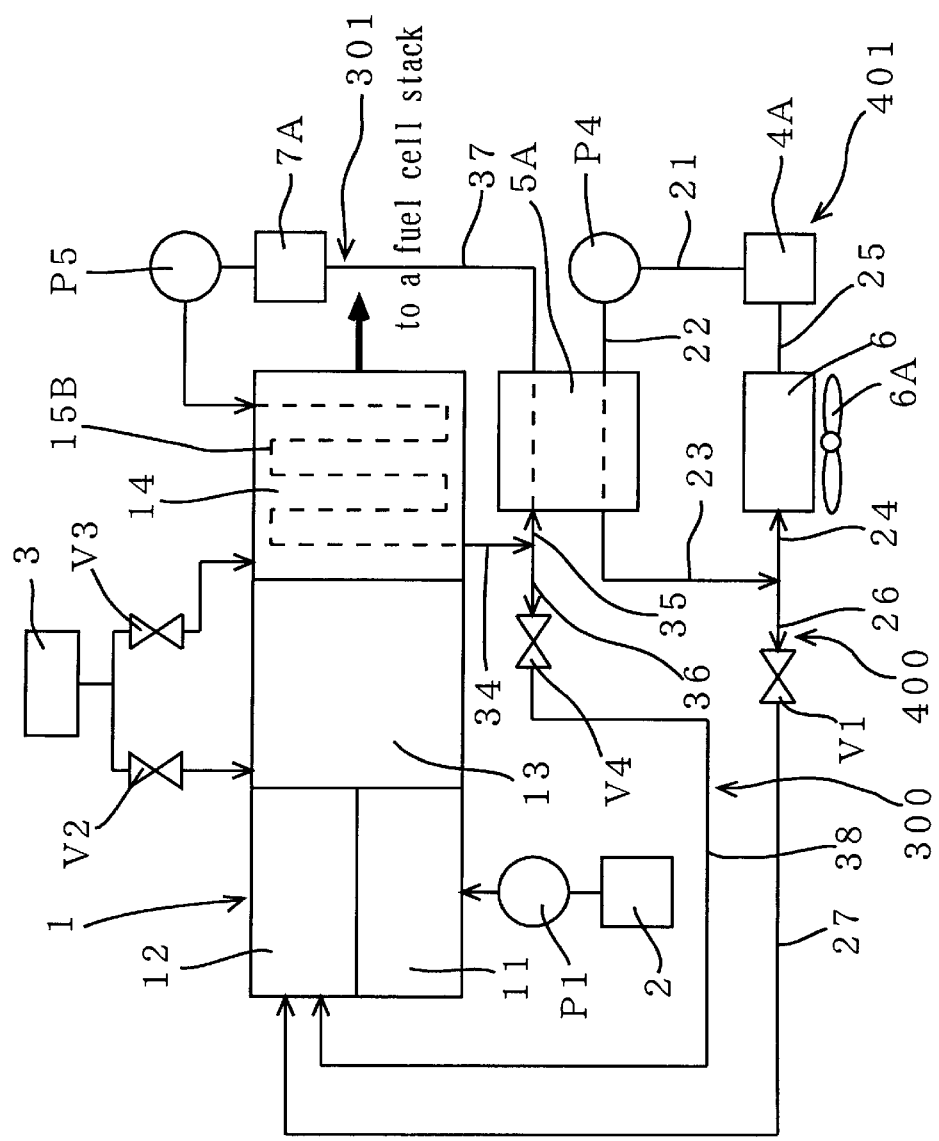
FIG. 2 is a schematic diagram of a reforming system including a reformer in accordance with a second embodiment of the present invention.

With reference to FIG. 2, there is illustrated a schematic diagram of a reforming system including a reformer 1 in accordance with a second embodiment of the present invention. The reforming system includes a reformer 1, a methanol tank 2, an air compressor 3, a water supply portion 300 and a methanol supply portion 400. The methanol tank 2 is connected to a combustion portion 11 of the reformer 1 by way of a pump P1.

The water supply portion 300, which acts as a main raw material supply means, is made up of a water tank 7A, a pump P5, a heat exchanger 5A, and a flow control valve V4. The water tank 7A is a means for storing therein an amount of water which is one of the raw materials to be reformed. The water also acts as a coolant for cooling a CO reduction portion 14 of the reformer 1.

In the CO reduction portion 14 of the reformer 1, there is provided a conduit 15B which is connected to the water tank 7A by way of the pump P5. The conduit 15B is also connected to the heat exchanger 5A by way of conduits 34 and 35. The heat exchanger 5A is connected to the water tank 7A by way of the conduit 37. The water tank 7A, the pump P5, the conduit 15B, and the heat exchanger 5A constitute a circulating conduit portion 301.

The conduit 15B is connected to the flow control valve V4 by way of the conduit 34 and a conduit 36. The conduit 34 is bifurcated into the conduits 34 and 35. The flow control valve V4 is connected to an evaporation portion 12 of the reformer 1 by way of a conduit 38. The conduit 15B is a means for cooling the circulating conduit portion 301 of the water supply portion 300.

The methanol supply portion 400, which acts as a secondary reforming raw material supply means, is made up of a methanol tank 4A. a pump P4, the heat exchanger 5A, a radiator 6 with a fan 6A and a flow control valve V1. The methanol tank 4A stores therein an amount methanol. The pump P4 feeds the methanol under pressure.

The methanol tank 4A is connected to the pump P4 and the radiator 6 by way of conduits 21 and 25, respectively.

The pump P4 is connected to the heat exchanger 5A by way of a conduit 22. The heat exchanger 5A is connected to the radiator 6 by way of conduits 23 and 24. The methanol tank 4A, the pump P4, the heat exchanger 5A, the radiator 6 and the conduits 21 to 25, inclusive, constitute a water circulating conduit portion 401.

The heat exchanger 5A is interposed between the coolant circulating conduit portion 301 and the water circulating conduit portion 401 for cooling the water circulating conduit portion 401.

The heat exchanger 5A is also connected to the flow control valve V1 by way of the conduit 23 and a conduit 26. The flow control valve V1 is connected to an evaporation portion 12 of the reformer 1 by way of a conduit 27.

Upon start up of the reforming system, the methanol is fed from the methanol tank 2 to the combustion portion 11 of the reformer 1 by the pump P1 and is burned at the combustion portion 11. Methanol is also fed to the evaporation portion 12 of the reformer 1 from the methanol tank 4A by way of the heat exchanger 5A and the flow control valve V1 by the actuation of the pump P4. Simultaneously, the pump P5 feeds water under pressure to the evaporation portion 12 of the reformer 1 from the water tank 7A by way of the conduit 15B and the flow control valve V4.

The water and methanol supplied to the evaporation portion 12 of the reformer 1, like those in the first embodiment, are evaporated, reformed at the reforming portion 13, and fed to the CO reduction portion 14. Due to the fact that the CO reduction reaction at the CO reduction portion 14 is heat generative, it is very important to cool the CO reduction catalyst down to a temperature which is suitable for such a reaction.

The water stored in the water tank 7A is supplied to the conduit 15B in the CO reduction portion 14 by the actuation of the pump P5 and cools the CO reduction catalyst while being preheated. The water drained from the conduit 15B is fed to the evaporation portion 12 by way of the conduits 34 and 36, the flow control valve V4 and the conduit 38. Excess water which is not supplied to the evaporation portion 12 is returned to the water tank 7A by way of the heat exchanger 5A and the conduit 37.

The water returned to the water tank 7A is cooled at the heat exchanger 5A by the methanol which is being supplied to the evaporation portion 12 from the methanol tank 4A. The methanol entering the evaporation portion 12 is preheated. Thus, less energy is required to evaporate the water and the methanol at the evaporation portion 12. In other words, the temperature of the combustion portion 11 can be made lower, which saves the amount of methanol to be supplied to the combustion portion 11.

The amount of methanol which is supplied to the heat exchanger 5A is larger than the amount of methanol supplied to the evaporation portion 12 and the resultant surplus methanol is returned to the methanol tank 4A by way of the conduits 23 and 24, the radiator 6 and the conduit 25. If the temperature of the returning methanol rises excessively, the fan 6A is turned on for forcefully cooling the methanol.

The pump P5 discharges the water at a fixed rate of 10 liters/min, while the pump P4 discharges the methanol at a fixed rate of 5 liters/min. The fan 6A is turned on and off when the temperature in the methanol tank 4A becomes not less than 46° C. and not greater than 44° C., respectively.

Such a control keeps the temperature of the water in the water tank 7A within a range from 70 to 80° C. Of the pumped 10 liters/min, the amount of water required by the reformer is supplied to the evaporation portion 12 by controlling the flow control valve V4. Of the pumped 5 liters/min, the amount of methanol required by the reformer is supplied to the evaporation portion 12 by controlling the flow control valve V1. The preheating of the water at the CO reduction portion 14 and the preheating of the methanol at the heat exchanger 5A reduce the amount of methanol to be burned at the combustion portion 11. Due to the fact that each preheating is done by using the heat generated at the CO reduction portion 14, the heat efficiency of the system is improved.

In the foregoing operation mode, since a fixed amount of water at stable temperature cools the CO reduction portion 14 when the load varies and when the load is steady, the temperature of the catalyst in the CO reduction portion 14 can be kept within a range from 110 to 190° C. independent of the operation conditions, thereby reducing the CO in the reformed gas to not greater than 10 PPM in stable fashion. The resultant reformed gas is fed to the fuel cell stack in stable fashion independent of load variations.

Instead of the water and the methanol as the primary and secondary raw materials of the reformed gas, a hydrocarbon family fuel and water may be used.

Third Embodiment

Figure 3:
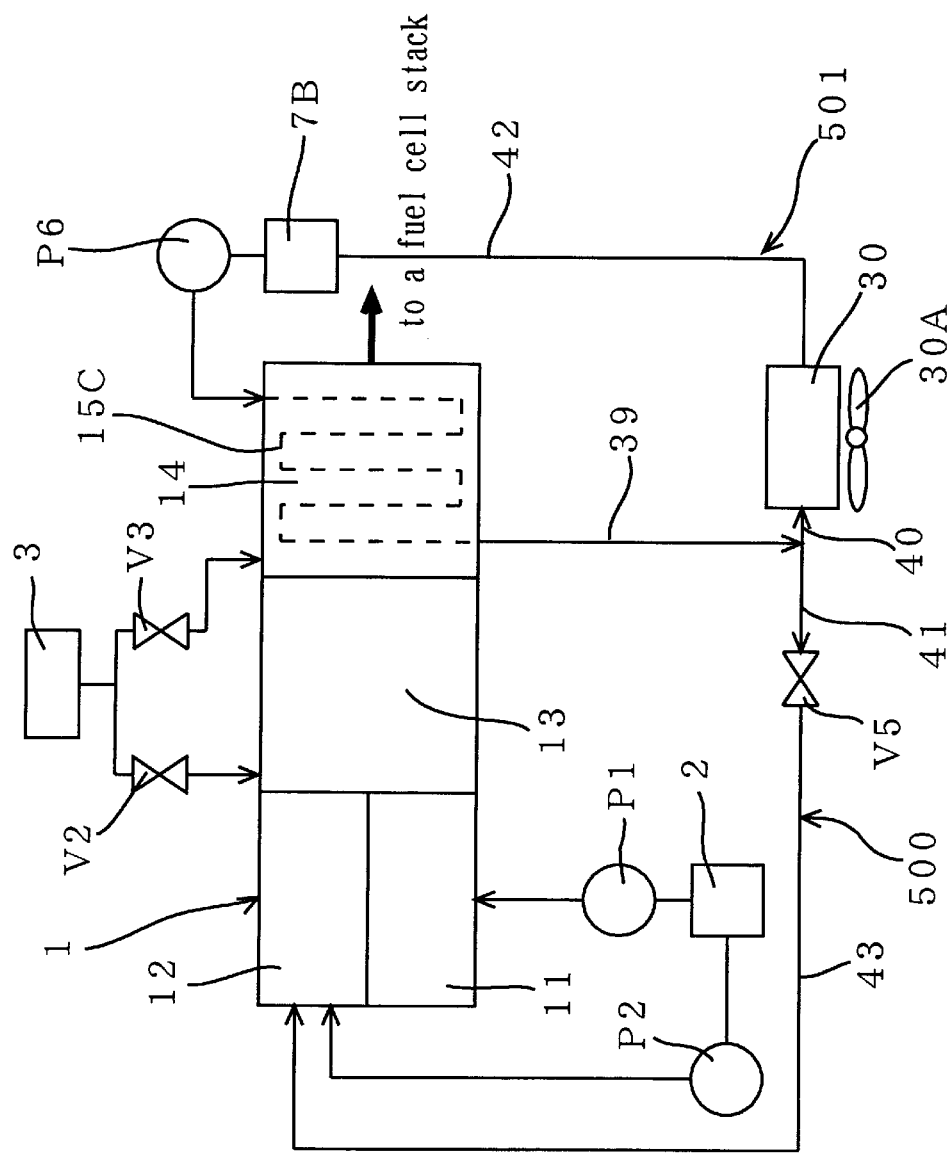
FIG. 3 is a schematic diagram of a reforming system including a reformer in accordance with a third embodiment of the present invention.

With reference to FIG. 3, there is illustrated a schematic diagram of a reforming system including a reformer 1 in accordance with a third embodiment of the present invention. The reforming system includes the reformer 1, a methanol tank 2, an air compressor 3, and a water supply portion 500. The water supply portion 500, which acts as a means for supplying raw material to be reformed, includes a water tank 7B, a pump P6, a radiator 30 with a fan 30A and a flow control valve V5. The water tank 7B is a means for storing therein an amount of water which is one of the raw materials to be reformed. This water acts as a coolant which is used to control a temperature of a CO reduction portion 14 of the reformer 1.

In the CO reduction portion 14 of the reformer 1, there is provided a conduit 15C through which water is passed for cooling a reforming catalyst (not shown). The water tank 7B is connected by way of the pump P6 to the conduit 15C, which is also connected to the radiator 30 by way of conduits 39 and 40. The radiator 30 is connected to the water tank 7B by way of a conduit 42. The water tank 7B, the pump P6, the conduit 15C and the radiator 30 constitute a water circulating conduit portion 501.

The conduit 15C is also connected to a flow control valve V5 by way of the conduit 39 and a conduit 41. The flow control valve V5 is connected to an evaporation portion 12 of the reformer 1 by way of a conduit 43. The conduit 15C is a means for cooling the water circulating portion of the water supply portion 500.

When the reforming system is started up, the methanol is supplied from the methanol tank 2 to a combustion portion 11 of the reformer 1 by the pump P1 and is burned at the combustion potion 11. The methanol is also supplied from the methanol tank 2 to the evaporation portion 12 of the reformer 1 by a pump P2. Simultaneously, the water in the water tank 7B is fed to the evaporation portion 12 of the reformer 1 by pump P6, by way of the conduit 15C and a flow control valve V5 which controls the flow rate of the water.

Similar to the first embodiment, the water and the methanol which are supplied to the evaporation portion 12 of the reformer 1 are evaporated thereat, reformed at a reforming portion 13 and fed to the CO reduction portion 14. Due to the fact that the chemical reaction at the CO reduction portion 14 is a heat generative one, it is very important to control the temperature of the CO reduction catalyst to a suitable value.

The water stored in the water tank 7B is supplied to the conduit 15C in the CO reduction portion 14 by the pump P6, which simultaneously preheats the water and cools the CO reduction catalyst. The water drained from the conduit 15C is supplied to the evaporation portion 12 of the reformer 1 by way of the conduit 39, the conduit 41, the flow control valve V5 and the conduit 43. Excess water which is not supplied to the evaporation portion 12 of the reformer 1 is returned to the water tank 7B by way of the radiator 30 and a conduit 42. If the temperature of the returned water exceeds a set value, the fan 30A is turned on, thereby establishing a forced cooling of the surplus water.

Thus, since the CO reduction portion 14 of the reformer 1 is supplied with a fixed amount of water when the load of the system varies, a stable temperature control of the catalyst which matches the chemical reaction independent of the operation condition results, thereby producing the reformed gas in stable fashion in such a manner that the CO in the reformed gas is reduced to not greater than 10 PPM. The resultant reformed gas is fed to the fuel cell stack in stable fashion independent of load variation.

Instead of water as the raw material of the reformed gas, a hydrocarbon family fuel or a mixture of hydrocarbon family fuel and water can be used.

Fourth Embodiment

Figure 4:
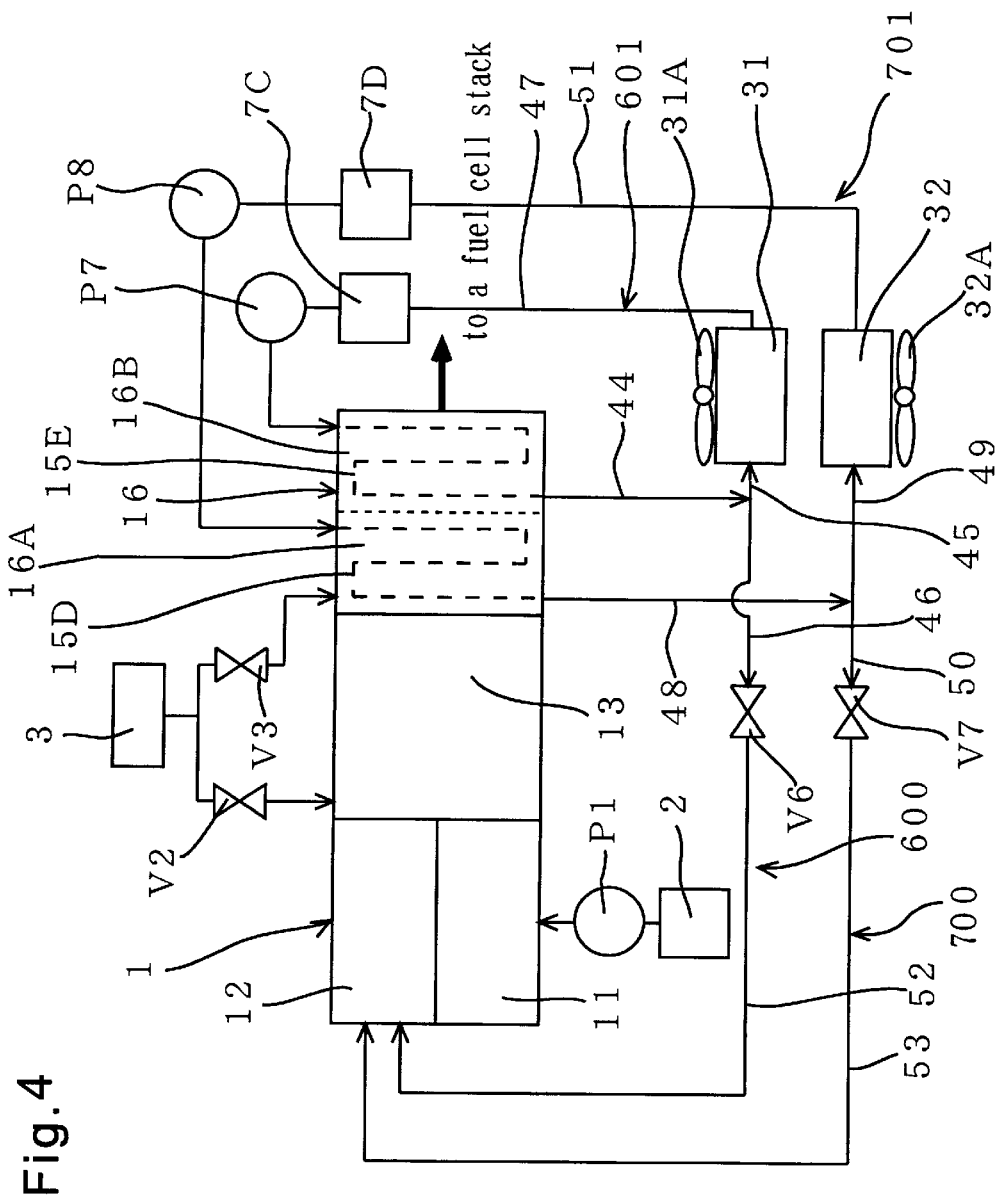
FIG. 4 is a schematic diagram of a reforming system including a reformer in accordance with a fourth embodiment of the present invention.

With reference to FIG. 4, there is illustrated a schematic diagram of a reforming system including a reformer 1 in accordance with a fourth embodiment of the present invention. The reforming system includes the reformer 1, a methanol tank 2, an air compressor 3, a methanol supply portion 600 and a water supply portion 700. The reformer 1 is made up of a combustion portion 11, an evaporation portion 12, a reforming portion 13 and a CO reduction portion 16 which has a first or front part 16A and a second or rear part 16B.

The methanol supply portion 600 as a means for supplying raw material to be reformed is made up of a methanol tank 7C which stores therein an amount of methanol as the raw material to be reformed, a pump P7, a radiator 31 with a fan 31A and a flow control valve V6. The methanol acts as coolant for cooling the second part 16B of the CO reduction portion 16.

In the second part 16B of the CO reduction portion 16, there is provided a conduit 15E for the temperature control of the catalyst which is connected to the methanol tank 7C by way of the pump P7. The conduit 15E is also connected to the radiator 31 by way of conduits 44 and 45. The radiator 31 is connected to the methanol tank 7C by way of a conduit 47. The methanol tank 7C, the pump P7, the conduit 15E, and the radiator 31 constitute a coolant circulating conduit portion 601.

The conduit 15E is also connected to the flow control valve V6 by way of conduits 44 and 46. The flow control valve V6 is connected to the evaporation portion 12 of the reformer 1 by way of a conduit 52. The conduit 15E is a means for cooling the coolant circulating conduit portion 601 of the methanol supply portion 600.

The water supply portion 700, which acts as a means for supplying another raw material, is made up of a water tank 7D, a pump P8, a radiator, 32 with a fan 32A and a flow control valve V7. The water tank 7D acts as a means for storing an amount of water which is one of raw materials to be reformed The water acts as a coolant for controlling of the temperature of the first part 16A of the CO reduction portion 16.

In the first part 16A of the CO reduction portion 16, there is provided a conduit 15D which is connected to the water tank 7D by way of the pump P8. The conduit 15D is also connected to the radiator 32 by way,of conduits 48 and 49. The radiator 32 is connected to the water tank 7D by way of a conduit 51. The water tank 7D, the pump P8, the conduit 15D and the radiator 32 constitute a circulating conduit portion 701.

The conduit 15D is also connected to a flow control valve V7 by way of conduits 48 and 50. The flow control valve V7 is connected to the evaporation portion 12 of the reformer 1 by way of a conduit 53. The conduit 15D is a means for cooling a coolant circulating conduit portion 701 of the water supply means 700.

When the reforming system is driven or turned on, the methanol is supplied from the methanol tank 2 to the combustion portion 11 of the reformer 1 by the pump P1 and is burned thereat. Simultaneously, the pump P8 supplies water to the evaporation portion 12 of the reformer 1 from the water tank 7D by way of the conduit 15D and the flow control valve V7. In addition, the pump P7 supplies the methanol from the methanol tank 7C to the evaporation portion 12 of the reformer 1 by way of a conduit 15E and the flow control valve V6.

Like in the first embodiment the water and the methanol supplied to the evaporation portion 12 of the reformer 1 is evaporated, reformed at the reforming portion 13 and fed to the CO reduction portion 16. In the CO reduction portion 16, CO reduction occurs through a heat generative chemical reaction, which requires that a suitable temperature be maintained by cooling the CO reduction catalyst.

The water stored in the water tank 7D is supplied to conduit 15D in the first part 16A of the CO reduction portion 16 by the pump P8. The water is thereby simultaneously preheated and the CO reduction catalyst cooled. The water drained from the conduit 15D is supplied to the evaporation portion 12 of the reformer 1 by way of the conduits 48 and 50, the flow control valve V7, and the conduit 53. Excess water, which is not supplied to the evaporation portion 12, is returned to the water tank 7D by way of the radiator 32 and the conduit 51. If the temperature of the water exceeds a set value, forced cooling thereof is performed by turning on the fan 32A.

The methanol stored in the methanol tank 7C is supplied to the conduit 15E in the second part 16B of the CO reduction portion 16 by the pump P7. In the conduit 15E, the methanol is preheated and simultaneously cools the CO reduction catalyst. The methanol drained from the conduit 15E is supplied to the evaporation portion 12 of the reformer 1 by way of the conduits 44 and 46, the flow control valve V6, and the conduit 52. Excess methanol, which is not supplied to the evaporation portion 12, is returned to the methanol tank 7C by way of the radiator 31 and the conduit 47. In the case where the temperature of the returning methanol exceeds a set value, the fan 31A is turned on, thereby causing a forced cooling of the methanol.

Thus, the first part 16A and the second part 16B of the CO reduction portion 16 are cooled by the water and the methanol, each of which has a fixed flow rate and temperature even when the load of the system varies, which permits a stable temperature control of the catalyst which matches the chemical reaction independent of the operation conditions, thereby producing the reformed gas in stable fashion in such a manner that the CO in the reformed gas is reduced to not greater than 10 PPM.

It is to be noted instead of the foregoing disclosure, the first part 16A and the second part 16B of the CO reduction portion 16 can instead be cooled by the methanol and the water, respectively.

The invention has thus been shown and description with reference to specification, however, it should be understood that the invention is in no way limited to the details of the illustrates structures but changes and modifications may be made without departing from the scope of the appended claims.

What is claimed is:

1. A reformer comprising:

an evaporation portion for evaporating a hydrocarbon family fuel and water as raw materials to produce evaporated raw materials;

a reforming portion connected to receive the evaporated raw materials from the evaporation portion and adapted for producing a reformed gas whose principal element is hydrogen from the evaporated raw materials;

a CO reduction portion connected to the reforming portion and adapted for reducing CO in the reformed gas from the reforming portion;

storage means for storing at least one of the raw materials;

recirculating means including a recirculating conduit portion for recirculating the stored at least one of the raw materials in a recirculation direction by feeding means for feeding the raw materials under pressure in said recirculating conduit portion;

cooling means for cooling the CO reduction portion using a cooling fluid;

a heat exchanger positioned and configured to exchange heat between said cooling means and said recirculating conduit portion, the heat exchanger including means which do not mix the cooling fluid with the at least one of the raw materials; and supply means for supplying the raw materials to the evaporation portion, the supply means including a branch conduit branched from the recirculating conduit portion at a position downstream from the feeding means in the recirculation direction and connected to the evaporation portion, and a flow control means provided in the branch conduit.

2. A reformer as set forth in claim 1, wherein the cooling means includes means for recirculating at least one of the raw materials.

3. A reformer as set forth in claim 1, wherein the cooling means includes a heat-exchanger for the CO reduction portion.

4. A reformer as set forth in claim 1, wherein the reformer is connected so as to supply a reformed gas to a fuel cell stack.

* * * * *